(12) United States Patent
Kawada

(10) Patent No.: US 8,622,565 B2
(45) Date of Patent: Jan. 7, 2014

(54) BACKLIGHT DEVICE FOR LIQUID CRYSTAL MODULE

(75) Inventor: Kazuaki Kawada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 131 days.

(21) Appl. No.: 12/430,152

(22) Filed: Apr. 27, 2009

(65) Prior Publication Data

US 2010/0046206 A1 Feb. 25, 2010

(30) Foreign Application Priority Data

Aug. 20, 2008 (JP) .................. 2008-211261

(51) Int. Cl.
G09F 13/04 (2006.01)
G09F 13/08 (2006.01)

(52) U.S. Cl.
USPC .......................................... 362/97.2; 362/634

(58) Field of Classification Search
USPC .......... 362/97.1–97.2, 632–634, 217.01–225; 349/58
See application file for complete search history.

(56) References Cited

U.S. PATENT DOCUMENTS

| | | | |
|---|---|---|---|
| 5,134,548 A * | 7/1992 | Turner | 362/29 |
| 5,568,680 A | 10/1996 | Parker | |
| 6,464,378 B1 | 10/2002 | Reed et al. | |
| 7,883,236 B2 * | 2/2011 | Vanden Eynden | 362/217.05 |
| 2003/0002279 A1 | 1/2003 | Fiene | |
| 2004/0012971 A1 * | 1/2004 | Tsai et al. | 362/390 |
| 2007/0230206 A1 | 10/2007 | Hsiao et al. | |
| 2008/0079865 A1 * | 4/2008 | Kang et al. | 349/61 |
| 2009/0268473 A1 * | 10/2009 | Ohnishi et al. | 362/362 |

FOREIGN PATENT DOCUMENTS

| | | |
|---|---|---|
| JP | 54-030095 Y2 | 9/1979 |
| JP | 09-216618 A | 8/1997 |
| JP | 2004-055182 A | 2/2004 |
| JP | 2004-102119 A | 4/2004 |
| JP | 2005-322645 A | 11/2005 |
| WO | WO-2006/003913 A1 | 1/2006 |

OTHER PUBLICATIONS

Office Action of corresponding EP Application No. 09 161 741.5 dated Jul. 26, 2011.

* cited by examiner

*Primary Examiner* — Jason Moon Han
(74) *Attorney, Agent, or Firm* — Global IP Counselors

(57) ABSTRACT

A backlight device for a liquid crystal module includes a linear light source and a light reflecting member. The light reflecting member reflects light emitted from the linear light source. The light reflecting member includes a center reflecting face, a pair of first peripheral reflecting faces and a pair of second peripheral reflecting faces. The center reflecting face and the first and second peripheral reflecting faces are integrally formed from a sheet-like member as a one-piece, unitary member.

8 Claims, 3 Drawing Sheets

BACKLIGHT DEVICE FOR LIQUID CRYSTAL MODULE

CROSS-REFERENCE TO RELATED APPLICATIONS

This application claims priority to Japanese Patent Application No. 2008-211261, filed on Aug. 20, 2008. The entire disclosure of Japanese Patent Application No. 2008-211261 is hereby incorporated herein by reference.

BACKGROUND OF THE INVENTION

1. Field of the Invention

The present invention generally relates to a backlight device for a liquid crystal module. More specifically, the present invention relates to a backlight device for a liquid crystal module.

2. Background Information

A conventional liquid crystal module includes a liquid crystal cell and a backlight device. The backlight device is disposed directly behind the liquid crystal cell.

The backlight device mainly includes a linear light source, a light reflecting member, a plurality of optical sheets and a frame. The linear light source includes a straight tube or U-tube fluorescent tube. Electrodes at the ends of the linear light source are fitted into a power socket. The light reflecting member is disposed at the back of the linear light source. The light reflecting member includes a reflecting face. The light from the linear light source is reflected by the light reflecting member, and shines from the back onto the liquid crystal cell. The optical sheets include a light diffusing plate, and are disposed in the required type and number between the light reflecting member and the liquid crystal cell. The light reflected by the reflecting face of the light reflecting member passes through the optical sheets, and shines on the liquid crystal cell from the back, which maintains the brightness balance of an image display face of the liquid crystal cell. The frame supports the linear light source, the light reflecting member and the optical sheets. The frame is made of molded resin or sheet metal.

The linear light source and the light reflecting member are mounted in the frame. All or substantially all of the surface of the light reflecting member is a reflecting face. The reflecting face is divided into one wide, rectangular center region located at the back of the linear light source, and slender, trapezoidal peripheral regions that are raised up in a slanted orientation from four sides of the center region.

With the conventional backlight device, the light reflecting member is formed by combining a sheet that can be bent, and frame pieces. The frame pieces are formed from resin by injection molding.

The sheet is bent along straight bending lines set at places near the two long sides, and has a silhouette shape that is substantially rectangular. The sheet is bent and held so that the rectangular center region and two of the trapezoidal peripheral regions on either side of the center region are formed in the sheet. In the two peripheral regions formed by the sheet, the ends in the lengthwise direction of each of the peripheral regions are formed in a shape such that the spacing between the ends of each of the peripheral regions widens moving away from the bending lines. Thus, the peripheral regions are formed in a trapezoidal shape.

The frame piece is a resin molding formed by injection molding. The frame piece has a slender, slanted, trapezoidal reflecting face. The frame pieces are disposed symmetrically on either side in the lengthwise direction of the sheet. The slender, trapezoidal reflecting faces of the frame pieces are used as the other two peripheral regions. The ends of the slender, trapezoidal reflecting faces of the frame pieces are butted against the ends of the slender, trapezoidal peripheral regions formed by the sheet, and the butting configuration of the four peripheral regions forms a rectangular shape.

Meanwhile, with another conventional backlight device, the light from a light source is reflected by a reflecting plate (see Japanese Laid-Open Patent Application Nos. 2004-102119 and 2004-55182, for example). In the conventional backlight device, uneven brightness is avoided by providing a peaked portion to the reflecting plate. Furthermore, warping of the reflecting plate is prevented by using a multilayer structure for the reflecting plate.

However, when the light reflecting member is a combination of the sheet with the two frame pieces, three components are required to form the light reflecting member, namely, the sheet and the two frame pieces. This not only increases the cost, but also makes the assembly process more complicated and diminishes productivity.

In view of the above, it will be apparent to those skilled in the art from this disclosure that there exists a need for an improved backlight device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a backlight device whose production cost is reduced.

In accordance with one aspect of the present invention, a backlight device for a liquid crystal module includes a linear light source and a light reflecting member. The linear light source is configured to emit light. The light reflecting member is arranged to reflect the light emitted from the linear light source toward a liquid crystal cell of the liquid crystal module. The light reflecting member includes a center reflecting face, a pair of first peripheral reflecting faces and a pair of second peripheral reflecting faces. The center reflecting face is formed in a rectangular shape and disposed rearward with respect to the linear light source. The pair of first peripheral reflecting faces is formed in a trapezoidal shape and extends from a pair of first opposing side portions of the center reflecting face frontward and outward with respect to the center reflecting face, respectively. The pair of second peripheral reflecting faces is formed in a trapezoidal shape and extends from a pair of second opposing side portions of the center reflecting face frontward and outward with respect to the center reflecting face, respectively. The center reflecting face and the first and second peripheral reflecting faces are integrally formed from a sheet-like member as a one-piece, unitary member.

With the backlight device of the present invention, it is possible to provide a back light device whose production cost is reduced.

These and other objects, features, aspects and advantages of the present invention will become apparent to those skilled in the art from the following detailed descriptions, which, taken in conjunction with the annexed drawings, disclose selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
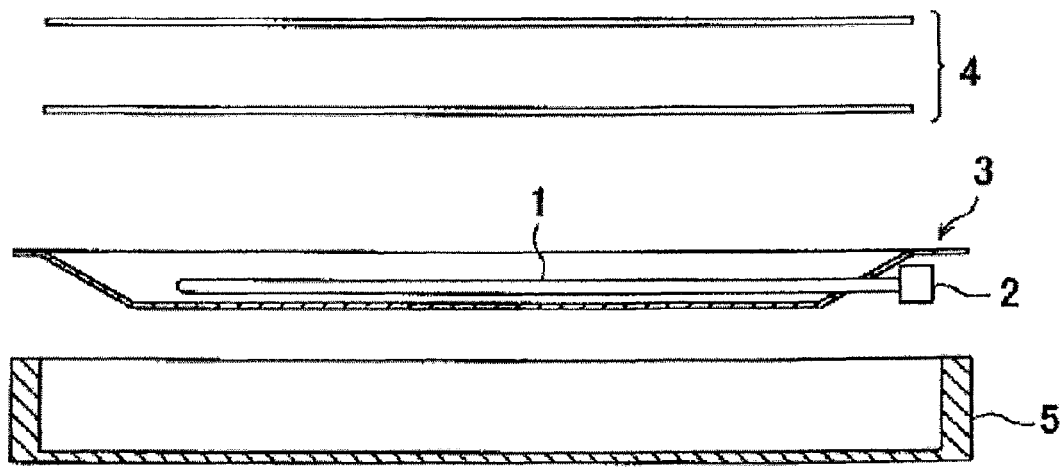
FIG. 1 is a cross sectional view of a backlight device for a liquid crystal module in accordance with a first embodiment of the present invention.
Figure 5:
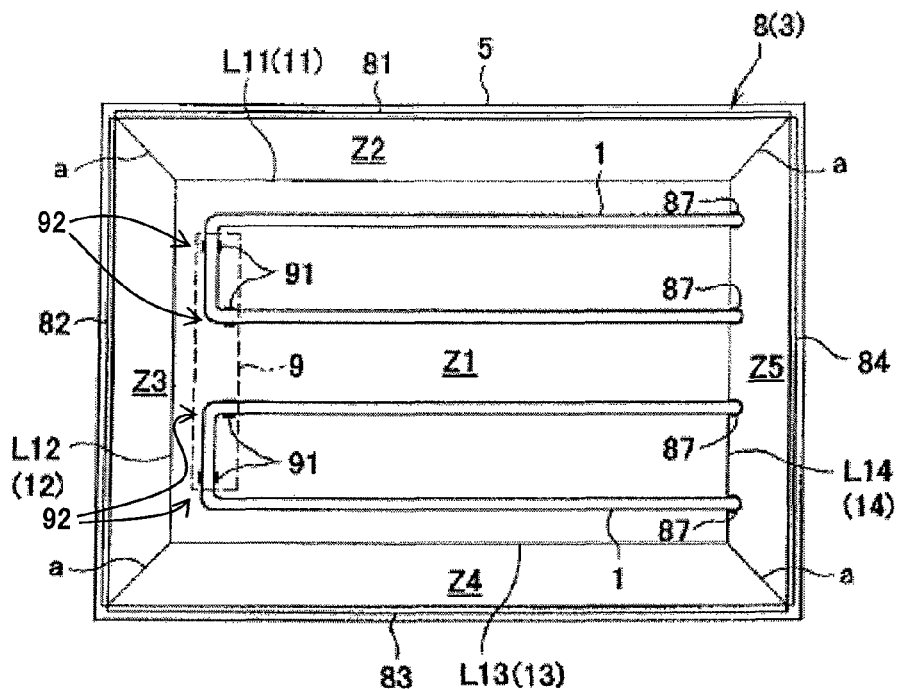
FIG. 5 is a front elevational view of the backlight device illustrated in FIG. 1.

A liquid crystal module includes a liquid crystal cell (not shown) and a backlight device. The backlight device is disposed directly behind the liquid crystal cell. As shown in FIGS. 1 and 5, the backlight device mainly includes a pair of linear light sources 1, a light reflecting member 3, a plurality of optical sheets 4 and a frame 5. The linear light sources 1 emit light. Each of the linear light sources 1 includes a U-shaped fluorescent tube. The linear light source 1 has electrodes at ends of the linear light source 1. The electrodes are inserted into power sockets 2 to supply electronic power to the linear light source 1. The light reflecting member 3 is disposed at the back (e.g., the rear side) of the linear light source 1, and has a reflecting face. The light from the linear light source 1 is reflected by the light reflecting member 3, and shines from the back toward the liquid crystal cell. The light reflecting member 3 is formed as a one-piece, unitary member. The optical sheets 4 includes a light diffusing plate, and are disposed in the required type and number between the light reflecting member 3 and the liquid crystal cell. The light reflected by the reflecting face of the light reflecting member 3 passes through the optical sheets 4, and shines on the liquid crystal cell from the back. As a result, the brightness balance of a display face of the liquid crystal cell is maintained. The linear light source 1, the light reflecting member 3 and the optical sheets 4 are supported on the frame 5. The frame 5 is made of molded resin or sheet metal.

Figure 2:
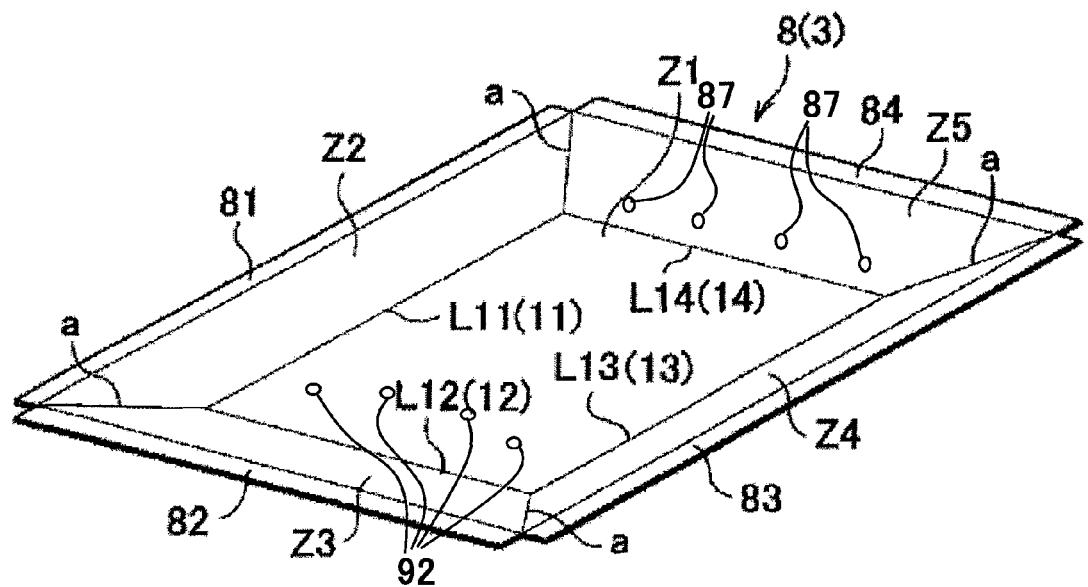
FIG. 2 is a perspective view of a light reflecting member of the backlight device illustrated in FIG. 1.

As shown in FIG. 2, the light reflecting member 3 is made of a sheet (e.g., sheet-like member) 8. The entire light reflecting member 3 is formed by just the single sheet 8 as a one-piece, unitary member. In other words, the light reflecting member 3 is not formed by combining a sheet with frame pieces, as the conventional light reflecting member. All or substantially all of the surface of the light reflecting member 3 is a reflecting face.

The sheet 8 has a center region (e.g., center reflecting face) Z1, a pair of top and bottom peripheral regions (e.g., a pair of first peripheral reflecting faces) Z2 and Z4, and a pair of left and right trapezoidal peripheral regions (e.g., a pair of second peripheral reflecting faces) Z3 and Z5. The center region Z1 is formed in a rectangular shape. The center region Z1 is located at the back of the linear light source 1. The peripheral regions Z2, Z3, Z4, and Z5 are formed in a trapezoidal shape. The peripheral regions Z2, Z3, Z4, and Z5 are raised up in a slanted orientation from four sides 11, 12, 13, and 14 of the center region Z1. Specifically, the top and bottom peripheral regions Z2 and Z4 extend from top and bottom long side portions (e.g., a pair of first opposing side portions) of the center region Z1 frontward and outward with respect to the center region Z1. The left and right peripheral regions Z3 and Z5 extend from left and right short side portions (e.g., a pair of second opposing side portions) of the center region Z1 frontward and outward with respect to the center region Z1. The sheet 8 is bent at four places around the periphery of the center region Z1 along straight bending lines (e.g., bent portions) L11, L12, L13, and L14, which forms the peripheral regions Z2, Z3, Z4, and Z5, and also forms the center region Z1 having the four sides 11, 12, 13, and 14 that are formed by the bending lines L11, L12, L13, and L14. Therefore, the center region Z1 has a wide, rectangular region bounded by the four sides 11, 12, 13, and 14. Also, the peripheral regions Z2, Z3, Z4, and Z5 has slender, trapezoidal regions that are raised up in the slanted orientation from the four sides 11, 12, 13, and 14 of the center region Z1, respectively.

Figure 3:
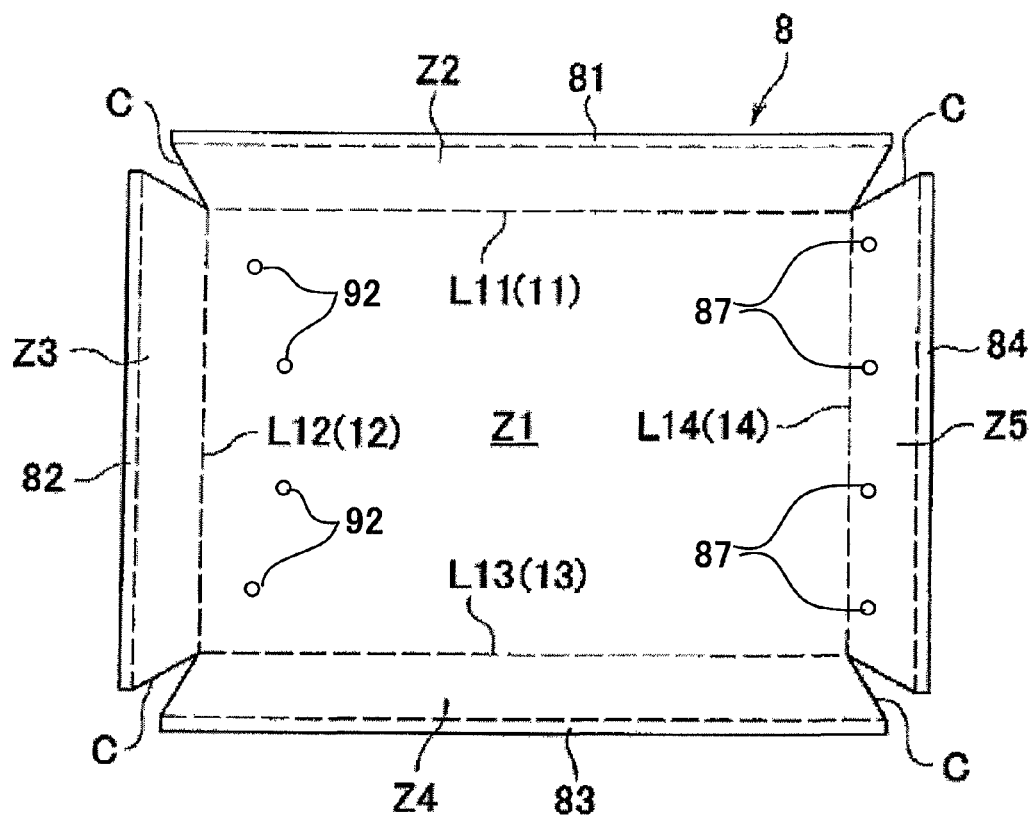
FIG. 3 is a development view of the light reflecting member illustrated in FIG. 2.

When the sheet 8 is spread out as shown in FIG. 3, the sheet 8 has a shape in which V-shaped cuts C having the same shape are formed at four corners of a rectangular sheet material. The straight lines that connect the bottom points (e.g., the vertex) of the cuts C correspond to the bending lines L11, L12, L13, and L14. The rectangular region bounded by the bending lines L11, L12, L13, and L14 corresponds to the center region Z1. Therefore, the places where the bending lines L11, L12, L13, and L14 are formed correspond to the four sides 11, 12, 13, and 14 of the center region Z1.

Outer regions of the four bending lines L11, L12, L13, and L14 are trapezoidal in shape. The trapezoidal regions correspond to the peripheral regions Z2, Z3, Z4, and Z5. With the sheet 8, slender extension tabs 81, 82, 83, and 84 are provided to outer edges of the peripheral regions Z2, Z3, Z4, and Z5, respectively. The extension tabs 81, 82, 83, and 84 are narrow in width.

When the trapezoidal regions are bent in the slanted orientation along the four straight bending lines L11, L12, L13, and L14, and the sheet 8 is held in the shape shown in FIG. 2, this forms the center region Z1 and the peripheral regions Z2, Z3, Z4, and Z5 that are raised up in the slanted orientation from the four sides 11, 12, 13, and 14 of the center region Z1, respectively. In between each one of adjacent pairs of the peripheral regions Z2, Z3, Z4, and Z5 that are adjacent to one another and flank respective one of the corners of the rectangular center region Z1 (e.g., the peripheral regions Z2 and Z3, the peripheral regions Z3 and Z4, the peripheral regions Z4 and Z5, and the peripheral regions Z5 and Z2), the ends (e.g., end portions) of the peripheral regions Z2, Z3, Z4, and Z5 are butted together to form butt joints (e.g., corner sections) a so that there is no gap in between. The extension tabs 81, 82, 83, and 84 of the outer edges of the peripheral regions Z2, Z3, Z4, and Z5 are bent outward. The extension tabs 81, 82, 83, and 84 correspond to the portions supported by the frame 5 as shown in FIG. 1.

As shown in FIG. 5, the U-shaped fluorescent tubes are used for the linear light source 1. The end electrodes of the linear light source 1 are connected to the power sockets 2 disposed in the empty space at the back of the peripheral region Z5 of the sheet 8. The linear light source 1 passes through holes 87 formed in the peripheral region Z5 and sticks out to the rear of the peripheral region Z5, where it is connected to the power sockets 2. Each of the through holes 87 has a closed hole with a continuous periphery. On the back side of the sheet 8, a fixing piece 9 is affixed to the frame 5. The fixing piece 9 has clamps 91. The clamps 91 stick out to the front side of the sheet 8 from openings 92 made at places on the center region Z1 of the sheet 8. The clamps 91 support the linear light sources 1 at suitable locations, such as the two locations of the bent portion shown in FIG. 5.

With the backlight device, the light reflecting member 3 is formed by just a single sheet 8, and furthermore the sheet 8 is formed by bending a substantially rectangular sheet material with the shape shown in FIG. 3 at an angle and at four places around the periphery of the material. Thus, the cost of producing the light reflecting member 3 is markedly lower than the conventional light reflecting member. Also, the assembly process for the light reflecting member 3 involves merely bending a single sheet material at four places around its periphery and at an angle. Thus, the process is much simpler than the conventional light reflecting member that requires skill to combine the sheet with the frame pieces. Therefore, this promotes a simpler assembly process for the backlight device, and the productivity tends to be higher. Furthermore, no gaps are produced at the boundary between each one of the adjacent pairs of the peripheral regions Z2, Z3, Z4, and Z5 (e.g., at the butt joints a). As a result, the light is appropriately reflected, and it is unlikely that the brightness of the liquid crystal cell is uneven.

With the backlight device, the reflecting faces are formed on the light reflecting member 3. Specifically, the center region Z1 located at the back of the linear light source 1 and the peripheral regions Z2, Z3, Z4, and Z5 that are raised up in a slanted orientation from the four sides 11 to 14 of the center region Z1, are all formed by just the one sheet 8. Accordingly, there is no need to form the center region Z1 and the peripheral regions Z2, Z3, Z4, and Z5 by combining the conventional sheet with the conventional frame pieces. Thus, the light reflecting member 3 can be formed by just the one sheet 8. As a result, there is no need to using extra components such as the frame pieces, and the number of parts that are needed can be correspondingly reduced. This promotes a simpler assembly process. Furthermore, the sheet 8 is more readily available and much less expensive than a resin molding formed by injection molding, which is expensive and demands sophisticated technology, as with the conventional frame pieces. Therefore, with the backlight device, it is possible to provide a backlight device much more inexpensively. Furthermore, this helps reduce the weight of the backlight device.

Figure 6:
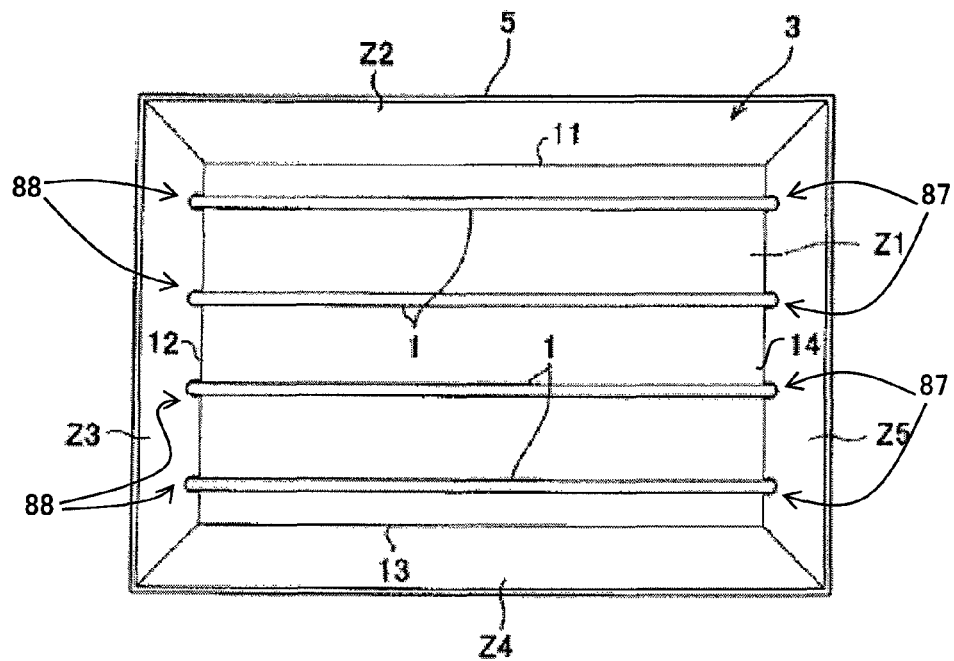
FIG. 6 is a front elevational view of another example of the backlight device.

As shown in FIG. 5, the linear light sources 1 include the U-shaped fluorescent tubes, and the bent portions of the linear light sources 1 are supported by the clamps 91 at locations between the peripheral regions Z3 and Z5. However, the bent portions of the linear light sources 1 can be positioned on the back side of the peripheral region Z3, and be supported by clamps formed on the frame 5 at locations back side of the peripheral region Z3. In this case, the peripheral region Z3 also has through holes through which the linear light sources 1 are disposed. Furthermore, as shown in FIG. 6, the linear light sources 1 can include a plurality of (four in FIG. 6) straight tubes. In this case, the peripheral region Z3 has two pairs of through holes 88 through which the left end portions of the linear light sources 1 are disposed, and the peripheral region Z5 has two pairs of through holes 87 through which the right end portions of the linear light sources 1 are disposed.

Second Embodiment

Figure 4:
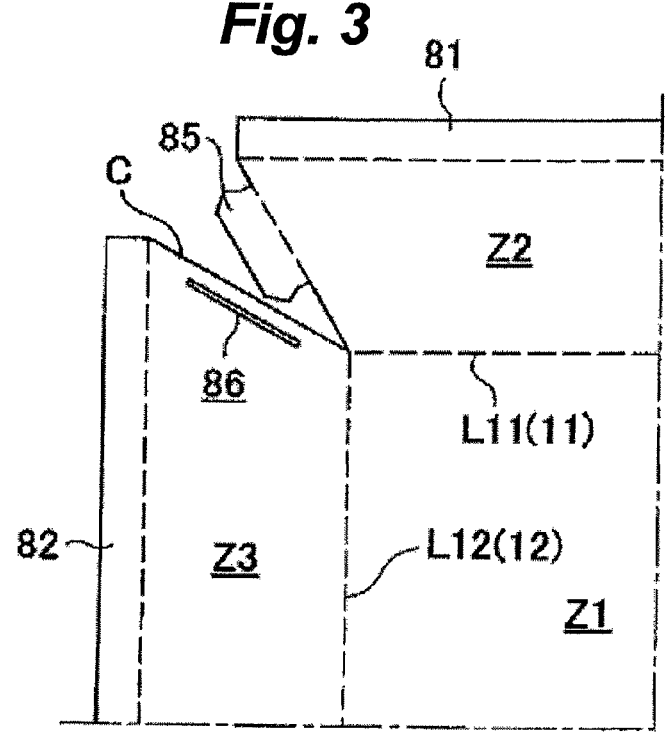
FIG. 4 is a detail development view of a light reflecting member in accordance with a second embodiment of the present invention.

Referring now to FIG. 4, a backlight device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a double prime (").

FIG. 4 is a detail development view of the sheet 8" in accordance with the second embodiment. The sheet 8" has a coupling portion that couples the top and bottom peripheral regions Z2 and Z4 with the left and right peripheral regions Z3 and Z5, respectively. The coupling portion includes four insertion tabs 85 and four slits 86. The insertion tabs 85 are provided to and extend from horizontal end portions of the peripheral regions Z2 and Z4. The slits 86 are formed at vertical end portions of the peripheral regions Z3 and Z5. Each of the insertion tabs 85 is inserted into the corresponding one of the slits 86. For example, the insertion tab 85 is provided to the end of one peripheral region (such as the peripheral region Z2 in FIG. 4) out of any one of the adjacent pairs of the peripheral regions (such as the peripheral regions Z2 and Z3 in FIG. 4) that are adjacent to one another and flank one of the corners of the center region Z1. The slit 86 is formed at the end of the other peripheral region (such as the peripheral region Z3 in FIG. 4). The insertion tab 85 is inserted into the slit 86, and latched to the slit 86 to couple the one peripheral region with the other peripheral region. The insertion tab 85 can also be formed at the end of one peripheral region out of any one of the adjacent pairs of the peripheral regions (e.g., the peripheral regions Z3 and Z4, the peripheral regions Z4 and Z5, the peripheral regions Z5 and Z2, etc.) that are adjacent to one another and flank one of the corners of the center region Z1, and the slit 86 can be formed in the other peripheral region.

With the sheet 8", the sheet 8" can be held in the shape shown in FIG. 2 by bending at an angle along the bending lines L11, L12, L13, and L14. The insertion tabs 85 on the one peripheral regions are inserted into the insertion slits 86 on the other peripheral regions from either inside or outside of the one peripheral regions. When the insertion tabs 85 are thus inserted into the slits 86, the adjacent pairs of the peripheral regions (the peripheral regions Z2 and Z3, the peripheral regions Z3 and Z4, the peripheral regions Z4 and Z5, and the peripheral regions Z5 and Z2) are linked at the places where the insertion tabs 85 are inserted into the slits 86. Accordingly, this improves the ability of the sheet 8" to maintain the shape shown in FIG. 2. As a result, the stability of light reflection by the sheet 8" is increased. Furthermore, it becomes less likely that the brightness of the liquid crystal cell is uneven.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A backlight device for a liquid crystal module, comprising:
   a linear light source configured to emit light, the linear light source having a U-shape with a bent portion at one end of the linear light source and a pair of straight portions extending from both ends of the bent portion, respectively;
   a pair of clamps supporting the linear light source at the bent portion and one of the straight portions of the linear light source, respectively; and
   a light reflecting member arranged to reflect the light emitted from the linear light source toward a liquid crystal cell of the liquid crystal module, the light reflecting member including
      a center reflecting face that is formed in a rectangular shape and disposed rearward with respect to the linear light source, the center reflecting face having a pair of openings through which the clamps are disposed, respectively,
      a pair of first peripheral reflecting faces that is formed in a trapezoidal shape and extends from a pair of first opposing side portions of the center reflecting face frontward and outward with respect to the center reflecting face, respectively, and
      a pair of second peripheral reflecting faces that is formed in a trapezoidal shape and extends from a pair of second opposing side portions of the center reflecting face frontward and outward with respect to the center reflecting face, respectively, the center reflecting face and the first and second peripheral reflecting faces being integrally formed from a sheet-like member as a one-piece, unitary member,
   an end portion of one of the first peripheral reflecting faces abutting an end portion of one of the second peripheral reflecting faces that is adjacent to the one of the first peripheral reflecting faces to form a corner section of the light reflecting member at a corner portion of the center reflecting face with the corner portion of the center reflecting face being located between the one of the first peripheral reflecting faces and the one of the second peripheral reflecting faces,
   the light reflecting member further including a coupling portion that couples the end portion of the first peripheral reflecting face with the end portion of the second peripheral reflecting face,
   the coupling portion including an insertion tab that extends from one of the end portion of the first peripheral reflecting face and the end portion of the second peripheral reflecting face, and a slit portion that is formed on the other of the end portion of the first peripheral reflecting face and the end portion of the second peripheral reflecting face, the insertion tab being disposed through the slit portion to couple the end portion of the first peripheral reflecting face with the end portion of the second peripheral reflecting face.

2. The backlight device according to claim 1, wherein
   the first opposing side portions are longer than the second opposing side portions in length, and
   at least one of the second peripheral reflecting faces further includes a through hole with a continuous periphery, a part of the linear light source being disposed through the through hole of the second peripheral reflecting face.

3. A backlight device for a liquid crystal module, comprising:
   a linear light source configured to emit light, the linear light source having a U-shape with a bent portion at one end of the linear light source and a pair of straight portions extending from both ends of the bent portion, respectively;
   a pair of clamps supporting the linear light source at the bent portion and one of the straight portions of the linear light source, respectively;
   a light reflecting member arranged to reflect the light emitted from the linear light source toward a liquid crystal cell of the liquid crystal module, the light reflecting member including
      a center reflecting face that is formed in a rectangular shape and disposed rearward with respect to the linear light source, the center reflecting face having a pair of openings through which the clamps are disposed, respectively,
      a pair of first peripheral reflecting faces that is formed in a trapezoidal shape and extends from a pair of first opposing side portions of the center reflecting face frontward and outward with respect to the center reflecting face, respectively, and
      a pair of second peripheral reflecting faces that is formed in a trapezoidal shape and extends from a pair of second opposing side portions of the center reflecting face frontward and outward with respect to the center reflecting face, respectively, the center reflecting face and the first and second peripheral reflecting faces being integrally formed from a sheet-like member as a one-piece, unitary member; and
   a frame supporting the linear light source via the clamps,
   the light reflecting member further including extension tabs extending from outer peripheral edges of the first and second peripheral reflecting faces, respectively, the extension tabs being supported by side plates of the frame, respectively.

4. A backlight device for a liquid crystal module, comprising:
   a linear light source configured to emit light;
   a light reflecting member arranged to reflect the light emitted from the linear light source toward a liquid crystal cell of the liquid crystal module, the light reflecting member including
      a center reflecting face that is formed in a rectangular shape and disposed rearward with respect to the linear light source,
      a pair of first peripheral reflecting faces that is formed in a trapezoidal shape and extends from a pair of first opposing side portions of the center reflecting face frontward and outward with respect to the center reflecting face, respectively, and
      a pair of second peripheral reflecting faces that is formed in a trapezoidal shape and extends from a pair of second opposing side portions of the center reflecting face frontward and outward with respect to the center reflecting face, respectively, the center reflecting face and the first and second peripheral reflecting faces being integrally formed from a sheet-like member as a one-piece, unitary member; and a frame housing the light reflecting member, the frame having a bottom plate, a pair of first side plates and a pair of second side plates, the first and second side plates extending frontward from peripheral portions of the bottom plate with respect to the bottom plate, respectively, the first and second side plates defining an interior of the frame therebetween, the center reflecting face, the first peripheral reflecting faces and the second peripheral reflecting faces of the light reflecting member being disposed within the interior of the frame, the light reflecting member further including a pair of first extension tabs and a pair of second extension tabs, the first extension tabs extending from outer peripheral edges of the first peripheral reflecting faces, respectively, the first extension tabs being disposed on the first side plates of the frame, respectively, the second extension tabs extending from outer peripheral edges of the second peripheral reflecting faces, respectively, the second extension tabs being disposed on the second side plates of the frame, respectively, the first peripheral reflecting faces being slanted with respect to the center reflecting face such that the first peripheral reflecting faces extend inwardly away from the first side plates of the frame, respectively, as the first peripheral reflecting faces approach the center reflecting face, respectively, the second peripheral reflecting faces being slanted with respect to the center reflecting face such that the second peripheral reflecting faces extend inwardly away from the second side plates of the frame, respectively, as the second peripheral reflecting faces approach the center reflecting face, respectively, the light reflecting member further includes an insertion tab that extends from one of an end portion of one of the first peripheral reflecting faces and an end portion of one of the second peripheral reflecting faces, and a slit portion that is formed on the other of the end portion of the one of the first peripheral reflecting faces and the end portion of the one of the second peripheral reflecting faces, the insertion tab being disposed through the slit portion to couple the end portion of the one of the first peripheral reflecting faces with the end portion of the one of the second peripheral reflecting faces, the insertion tab having a narrow base portion and a wide end portion that extends from the narrow base portion to form a distal end of the insertion tab, the wide end portion having a width that is wider than that of the narrow base portion, the wide end portion including at least one engaging protrusion that engages with an edge of the slit portion such that the insertion tab is prevented from being disengaged from the slit portion while the insertion tab is disposed through the slit portion, the engaging protrusion having a peaked shape with an apex part, the engaging protrusion having a width that gradually increases as the engaging protrusion approaches to the apex part of the engaging protrusion from the distal end of the insertion tab.

5. The backlight device according to claim 3, wherein an end portion of one of the first peripheral reflecting faces abuts an end portion of one of the second peripheral reflecting faces that is adjacent to the one of the first peripheral reflecting faces to form a corner section of the light reflecting member at a corner portion of the center reflecting face with the corner portion of the center reflecting face being located between the one of the first peripheral reflecting faces and the one of the second peripheral reflecting faces.

6. The backlight device according to claim 5, wherein the light reflecting member further includes a coupling portion that couples the end portion of the first peripheral reflecting face with the end portion of the second peripheral reflecting face.

7. The backlight device according to claim 4, wherein one of the second peripheral reflecting faces includes a pair of through holes, each of the through holes having a continuous periphery, a pair of end portions of the linear light source being disposed through the through holes, respectively.

8. The backlight device according to claim 4, wherein the light reflecting member further includes a bent portion that is disposed between the center reflecting face and each of the first and second peripheral reflecting faces and extends along each of the first and second opposing side portions of the center reflecting face.

* * * * *